(12) United States Patent
Mori

(10) Patent No.: US 7,848,416 B2
(45) Date of Patent: Dec. 7, 2010

(54) VIDEO SIGNAL ENCODING APPARATUS AND VIDEO DATA ENCODING METHOD

(75) Inventor: Tetsuzo Mori, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1366 days.

(21) Appl. No.: 11/275,532

(22) Filed: Jan. 12, 2006

(65) Prior Publication Data

US 2006/0159172 A1  Jul. 20, 2006

(30) Foreign Application Priority Data

Jan. 18, 2005  (JP) .............................. 2005-010845

(51) Int. Cl.
*H04N 7/12* (2006.01)
*H04N 11/02* (2006.01)

(52) U.S. Cl. ................................. 375/240.13

(58) Field of Classification Search ............ 375/240.12, 375/240.13; 382/236
See application file for complete search history.

(56) References Cited

U.S. PATENT DOCUMENTS

| 6,625,215 | B1 * | 9/2003 | Faryar et al. | ............ | 375/240.13 |
| 6,952,448 | B2 | 10/2005 | Kawai et al. | ............ | 375/240.12 |
| 2006/0008006 | A1 * | 1/2006 | Cha et al. | ............... | 375/240.16 |

FOREIGN PATENT DOCUMENTS

| JP | 10-257366 | 9/1998 |
| JP | 2000-59731 | 2/2000 |
| JP | 2000-125300 | 4/2000 |
| JP | 2001-16541 | 1/2001 |
| JP | 2001-78199 | 3/2001 |
| JP | 2003-264840 | 9/2003 |
| WO | WO 99/67947 | 12/1999 |

OTHER PUBLICATIONS

Apr. 21, 2009 Japanese Official Action in Japanese Patent Appln. No. 2005-010845.

* cited by examiner

*Primary Examiner*—Betsy L Deppe
(74) *Attorney, Agent, or Firm*—Fitzpatrick, Cella, Harper & Scinto

(57) ABSTRACT

A video signal encoding apparatus comprises a decoding unit for decoding each compression still image data into a frame image; a supplementary information, extracting unit for extracting supplementary information added to each compression frame image data; a motion prediction process adoption judging unit for judging, on the basis of the supplementary information, whether the frame image can be subjected to a motion prediction process; and a compression moving image generating unit for selecting the inter-frame prediction encoding method and the intra frame encoding method on the basis of a judgement result by the motion prediction process adoption judging unit to generate the moving image data.

4 Claims, 7 Drawing Sheets

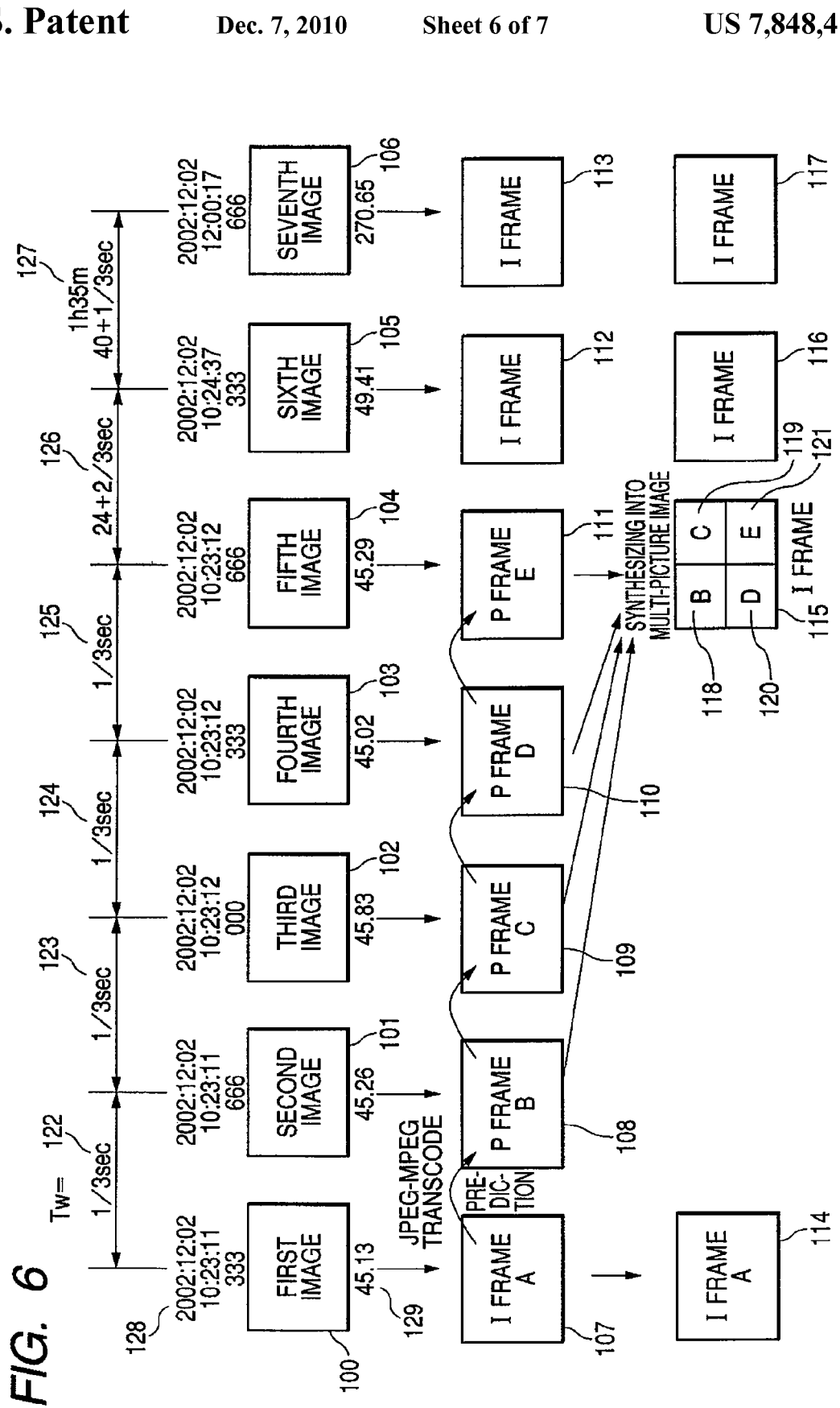

FIG. 7

| Exif TAG | USE | FORMAT |
|---|---|---|
| DateTimeOriginal | GENERATION DATE AND TIME OF ORIGINAL IMAGE | yyyy:mm:dd hh:mm:ss |
| DateTimeDigitized | DIGITIZATION DATE AND TIME OF IMAGE DATA | yyyy:mm:dd hh:mm:ss |
| SubSecTimeOriginal | SECONDS DOWN TO DECIMAL POINT OF GENERATION DATE AND TIME | 130[null] |
| SubSecTimeDigitized | SECONDS DOWN TO DECIMAL POINT OF DIGITIZATION DATE AND TIME | 130[null] |
| GpsImgDirection | PHOTOGRAPHING DIRECTION OF RECORDED IMAGE | 0.00 TO 359.99, IN CLOCKWIZE DIRECTION FROM NORTH (ZERO) |

VIDEO SIGNAL ENCODING APPARATUS AND VIDEO DATA ENCODING METHOD

BACKGROUND OF THE INVENTION

1. Field of the Invention

The present invention relates to a video signal encoding apparatus equipped in a digital camera, a digital video camera, an apparatus for managing images of a monitor camera, computer or; the like, and to a video signal encoding method. More particularly, the present invention relates to a video signal encoding apparatus and a video signal encoding method for converting a compression frame image information group encoded by an intra-frame encoding method into compression moving image information encoded by using both an inter-frame prediction encoding method and the intra-frame encoding method.

2. Related Background Art

Recent digital-cameras practically used have in addition to a still image photographing mode, a moving image photographing mode (intra-frame encoding method such as motion JPEG and MPEG1/2/4) and a voice recording mode.

In the compression encoding method for still images photographed with a digital camera and moving images photographed with a digital camera, a monitor camera and the like, the intra-frame compression encoding method is used which applies a compression algorithm only to only a single image. The JPEG format, JPEG2000 format and the like are typical intra-frame compression encoding methods. In the moving image compression method aiming at a high compression ratio, a compression method is used which incorporates both the inter-frame prediction encoding and intra-frame encoding methods. The MPEG format is a typical moving image compression encoding method. The essential different point between the still image compression method and moving image compression method lies in whether or not the inter-frame prediction is performed.

It has been proposed to apply the inter-frame prediction encoding frames capable of subjecting to the inter-frame prediction encoding process, as an approach to converting a still image format into a moving image format (refer to Japanese Patent Application Laid-Open No. 2001-78199). This approach detects a motion and a motion direction by using DCT coefficients of input compression data to reduce the amount of a process of obtaining a motion vector. Namely, frames having a motion detection result "with motion" are subjected to motion direction detection to perform the inter-frame prediction encoding process, whereas frames having a motion detection result "no motion" are not subjected to motion direction detection (without performing a process of obtaining a motion vector) to perform the intra-frame prediction encoding process.

As different from conventional analog cameras, digital cameras are not necessary to use films so that photographers have a tendency that a number of frames are photographed without any fear of failures or frames are photographed consecutively. Still images of a large number of digital photographs photographed in such a manner are likely to be confirmed, for example, on a liquid crystal display or the like built in the camera, and thereafter unnecessary still images are selected and deleted from a memory to leave only necessary images.

Depending upon such a use state of digital cameras, even if motion detection using DCT coefficients of input compression data is performed for a photographed image (still image) group of a digital camera, there is a high probability of a motion detection result "no motion". It is therefore inefficient to perform the motion detection process for the entirety of the still image group, prolonging the process time. It has been desired to develop an apparatus capable of performing motion detection more efficiently.

If the format of one still image is converted into the format of one moving image frame and the moving image after format conversion is reproduced in real time, the display time of each frame image is too short and the image contents cannot be admired.

Further, for example, a photographed image group or the like of digital photographs photographed consecutively has often analogous image contents. Therefore, if the format of one still image is converted into the format of one moving image frame and the moving image after format conversion is reproduced in real time, the display time of a plurality of analogous images is too long and the viewer may feel uncomfortable.

SUMMARY OF THE INVENTION

It is therefore an object of the present invention to provide a video signal encoding apparatus and a video signal encoding method capable of judging efficiently frames applicable to a motion prediction process.

It is another object of the present invention to provide a video signal encoding apparatus and a video signal encoding method capable of preventing a display time of each frame image from becoming short when compression moving image information after format conversion is reproduced.

It is still another object of the present invention to provide a video signal encoding apparatus and a video signal encoding method capable of preventing a display time of a plurality of frame images having analogous image contents from becoming long when compression moving image information after format conversion is reproduced.

In order to solve the above issues, the present invention provides a video signal encoding apparatus for converting a plurality of compression frame images (compression frame image information group) encoded by an intra-frame encoding method into compression moving image information encoded by using both an inter-frame prediction encoding method and the intra-frame encoding method, comprising: decoding means for decoding each compression frame image information of the compression frame image information group into a non-compressed frame image; supplementary information extracting means for extracting supplementary information added to each compression frame image information motion prediction process adoption judging means for judging whether each frame image can be subjected to a motion prediction process on basis of the supplementary information, for example, by comparing the supplementary information between frame images; and compression moving image generating means for selecting the inter-frame prediction-encoding method and the intra-frame encoding method in accordance with a judgement result by the motion prediction process adoption judging means to encode the frame image to generate the compression moving image information.

According to the present invention, it is judged on the basis of the supplementary information of the compression frame image information whether each frame is subjected to the motion prediction process, and the inter-frame prediction encoding method and the intra-frame encoding method is selected in accordance with the judgement result, to generate the compression moving image information from the compression frame image information group. It is therefore possible to judge adoption of the motion prediction process without precisely checking the signal contents of the compression frame image information group. Namely, the motion prediction process can be adopted only to necessary compression frame image information without executing the motion prediction process for all the compression frame image information. It is possible to efficiently convert the compression frame image information group into the compression moving image information.

The number of frames to be inserted immediately after each frame image is determined in accordance with the supplementary information or the judgement result by the motion prediction process adoption judging means, and frame image information for forming the same image as each frame image same are inserted by the determined number of frames immediately after each frame image to generate the compression moving image information. It is therefore possible to automatically generate the compression moving image information having a reproduction time suitable for observation, for each of the compression frame image information. It is therefore possible to prevent the display time of each frame image from becoming too short, when the compression moving image is reproduced.

Frame images, judged to adopt the motion prediction process, are synthesized as a synthesization image to generate the compression moving image information containing the synthesization image. It is therefore possible to automatically generate the compression moving image information containing a single image or the synthesization image suitable for observation, for each of the compression frame image information. It is therefore possible to prevent the display time of a plurality of frame images whose image contents are analogous from becoming too long, when the compression moving image information subjected to the format conversion is reproduced.

Other objects and features of the present invention will become apparent from the specification and drawings.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a diagram illustrating a video signal encoding sequence according to the third embodiment.

FIG. 7 is a diagram showing an example of the Exif specifications.

DETAILED DESCRIPTION OF THE PREFERRED EMBODIMENTS

In the following, the first to third embodiments of the present invention will be described with reference to the accompanying drawings.

First Embodiment

The first embodiment describes an example of a video signal encoding apparatus which inputs JPEG image data with supplementary information as a compression frame image in formation group subjected to intra-frame encoding and outputs MPEG2 video data as compression moving image information subjected to both inter-frame prediction encoding and intra-frame encoding.

Figure 1:
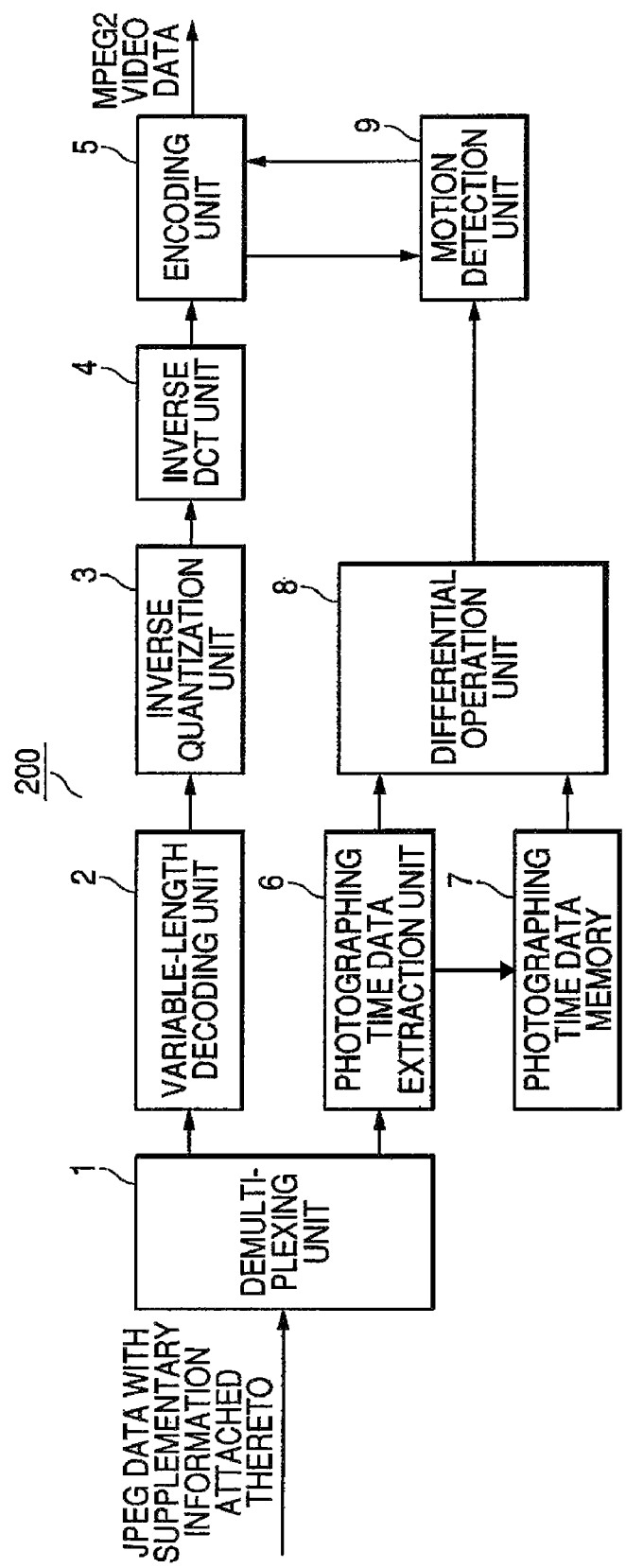
FIG. 1 is a block diagram showing part of the structure of a video signal encoding apparatus according to a first embodiment.

FIG. 1 is a block diagram showing part of the structure of a video signal encoding apparatus according to the first embodiment.

The video signal encoding apparatus 200 is constituted of: a demultiplexing unit (supplementary information extracting means) 1 for receiving JPEG image data with supplementary information; a variable-length decoding (VLD) unit (decoding means) 2 for decoding variable-length codes of JPEG image data; an inverse quantization unit (decoding means) 3 for executing an inverse quantization process of JPEG image data; an inverse DCT (IDCT) unit (decoding means) 4 for executing inverse discrete cosine transform of JPEG image data; an encoding unit (compression moving image generating means) 5 for encoding images reproduced from JPEG image data into MPEG2 video data; a photographing time extracting unit (supplementary information extracting means) 6 for extracting, as supplementary information, photographing time data from JPEG image data with supplementary information; a photographing time data memory (supplementary information extracting means) 7 for storing the extracted photographing time data; a differential operation unit (supplementary information extracting means) 8 for obtaining a time difference between photographing times; and a motion detection unit (motion prediction-process adoption judging means) 9 for detecting a motion vector between frame images.

Next, description will be made on the operation of the video signal encoding apparatus 200.

As shown in FIG. 1, the demultiplexing unit 1 separates JPEG image data (compression image information) with supplementary information into a JPEG image data and a supplementary information part, the JPEG image data being output to the VLD unit 2 and the supplementary information part being output to the photographing time data extracting unit 6. Next, the extracted. JPEG data is decoded at the VLD unit 2, inverse-quantization unit 3 and IDCT unit 4 in this order to obtain a non-compression still image (frame image). The reproduced still image is input to the encoding unit 5 to be converted into a MPEG2 moving image format. First supplementary information passed from the demultiplexing unit 1 to the photographing time extracting unit 6 is separated into first photographing time data and unnecessary information. The first photographing time data is held and at the same time output to the differential operation unit 8, whereas the unnecessary information is discarded. Upon reception of second supplementary information, the photographing time data extracting unit 6 sends the first photographing time data to the photographing time data memory 7. Similar to the above description, second supplementary information is separated into second photographing time data and unnecessary information. The second photographing time data is held and at the same time output to the differential operation unit 8, whereas the unnecessary information is discarded. Next, the differential operation unit 8 obtains a difference between the first and second photographing times to obtain photographing time interval data which is sent to the motion detection unit 9. If the photographing time interval is a predetermined value or smaller, the motion detection unit 9 executes a motion vector detection process on the image held in the encoding unit 5. The encoding unit 5 encodes (i.e., inter-frame prediction encoding process) as P picture for the image whose motion vector information is received from the motion detection unit, i.e., the image "with motion". Another image, i.e., an image whose photographing time interval is a predetermined value or larger or an image "no motion" is encoded (i.e., intra-frame encoding process) as I picture in the MPEG2 video format to thereby generate moving image data (compression moving image information) of the MPEG2 format.

Supplementary information will be described. FIG. 7 shows an example of the format of JPEG image data with supplementary information. This format is the digital still camera image file format (Exif) standardized by JEIDA (Japan Electronic Industry Development Association). In this embodiment, the motion detection process is executed by utilizing photographing time data (Date Time Original, Sub Sec Time Original) in supplementary information. The invention is not limited thereto, but any data may be used being selected from photographing date/time information, object distance, object position, photographing direction, progression direction, progression speed, latitude, longitude, height and the like.

Next, description will be made on a concrete operation of the video signal encoding apparatus 200. In this embodiment, not only the photographing time data but also photographing direction data is used in the supplementary information.

Figure 2:
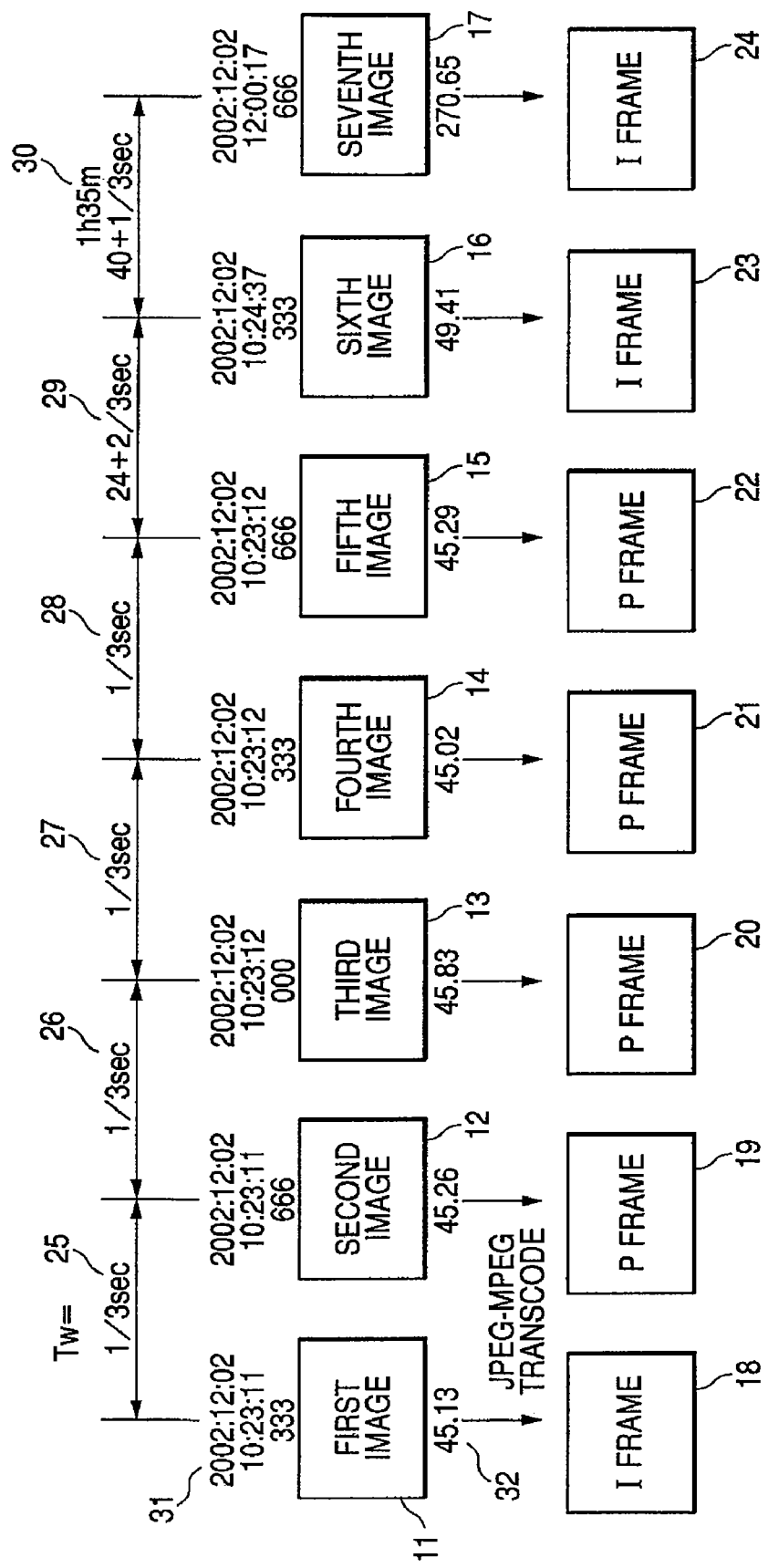
FIG. 2 is a diagram illustrating a video signal encoding sequence according to the first embodiment.

Referring to FIG. 2, a first JPEG image 11 is added with photographing time data 31 and photographing direction data 32. Similarly, photographing time data and photographing direction data are added to second to seventh JPEG images 12 to 17. The first JPEG image 11 is converted into the format of I frame 18 of the MPEG2 video format. The second JPEG image 12 is converted into the format of P frame 19 of the MPEG2 video format. Similarly, the third to fifth JPEG images 13 to 15 are converted into the format of P frames 20 to 22, and the sixth and seventh JPEG images 16 and 17 are converted into the format of I frames 23 and 24.

It can be understood from the photographing time data 31 and photographing direction data 32 that the first JPEG image was photographed Dec. 2, 2002, 10:23:11.333 at a direction angle of 45.13°. The photographing direction data is defined in such a manner that a photographing direction is indicated by an angle in a clockwise direction from the north of 0°. Similarly, it can be understood that the second JPEG image was photographed Dec. 12, 2002, 10:23:11.666 at a direction angle of 45.26°. It can be understood from a photographing time difference Tw 25 that the first and second JPEG images were photographed consecutively at an interval of ⅓ second. Since the photographing direction changes only by 0.13°, it can be presumed that the photographer photographed consecutively by directing the camera along the same direction.

It is herein-defined that the motion detection unit 9 executes the motion detection process under the conditions of a photographing time difference of 2 seconds or shorter and a photographing direction difference of ±3° or smaller and that if the photographing time difference and photographing direction difference are in the range of these conditions, then the encoding unit 5 executes the motion detection process. According to this definition, there is a possibility that the inter-frame prediction encoding (motion prediction process) is executed between the first and second JPEG images 11 and 12, so that motion vector detection is performed between these two frames.

Since it is assumed in this embodiment that motion vector detection succeeds, P frame 19 converted by referring to I frame 18 can be formed. Similarly, motion vector detection is performed between the second and third JPEG images 12 and 13, between the third and fourth JPEG images 13 and 14 and between the fourth and fifth JPEG images 14 and 15 to convert into P frames 20, 21 and 22.

According to the supplementary information, the photographing time difference is about 24 seconds and the photographing direction difference is about 4°, respectively between the fifth and sixth JPEG images 15 and 16. According to the above-described definition, the motion detection process is adopted if the photographing time difference is 2 seconds or shorter and the photographing direction difference is ±3° or smaller. However, in other cases, the motion detection process is not adopted and the inter-frame prediction encoding is abandoned. Therefore, the motion detection process will not be executed between the fifth and sixth JPEG images 15 and 16 to convert into I frame 23. Similarly, since the photographing time difference and photographing direction difference are greater than the defined values, the motion detection process will not be executed to convert into I frame 24.

As described above, according to the video signal encoding apparatus 200 of the first embodiment of the present invention, discriminating between a frame adopting the motion prediction process and a frame not adopting the motion prediction process is judged from the supplementary information on a JPEG image. In accordance with this judgment result, either the inter-frame prediction encoding method and the intra-frame prediction encoding method are selected to generate moving information of the MPEG2 video format from the JPEG image information group. It is therefore possible to judge whether the motion prediction process is adopted, without precisely checking signal contents of the JPEG image. Accordingly, the motion prediction process can be applied only to necessary frames without executing the motion detection process for all frames so that the JPEG image information group can be converted efficiently into moving image information of the MPEG2 video format.

Second Embodiment

The second embodiment describes an example of a video signal encoding apparatus which inputs JPEG image data with supplementary information as a compression frame image information group subjected to intra-frame encoding and outputs MPEG2 video data whose number of frame's is automatically adjusted, as compression moving image information subjected to both inter-frame prediction encoding and intra-frame encoding.

Figure 3:
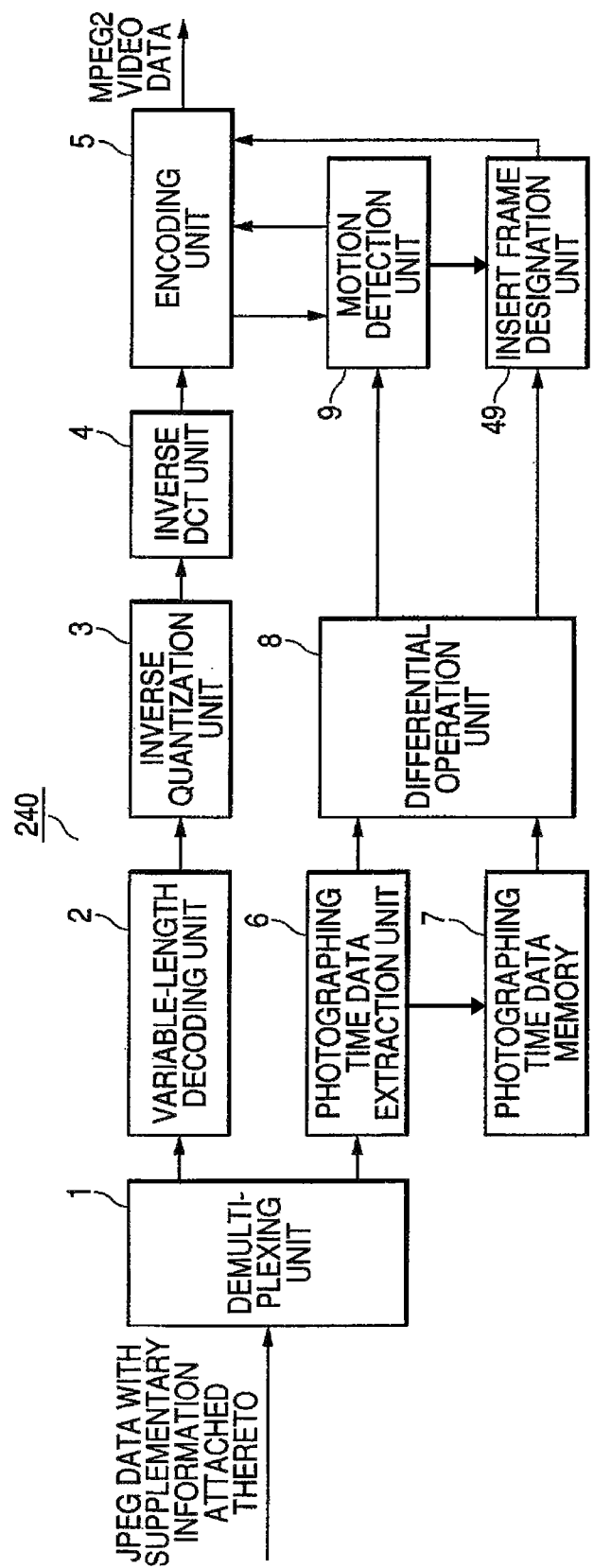
FIG. 3 is a block diagram showing part of the structure of a video signal encoding apparatus according to a second embodiment.

FIG. 3 is a block diagram showing part of the structure of a video signal encoding apparatus according to the second embodiment.

In FIG. 3, blocks having identical reference numerals to those of the first embodiment described with reference to FIG. 1 have similar functions. A different point from the first embodiment resides in that an insertion frame designation unit (insertion frame determining means) 49 is provided which designates the number of frames to be inserted into MPEG2 video data.

Next, the operation of a video signal encoding apparatus 240 will be described. The operation of generating MPEG2 moving image data from JPEG image data with supplementary information is similar to that of the first embodiment, and the description thereof is omitted.

The insertion frame designation unit 49 receives photographing time difference data from the differential operation unit 8 and the motion detection result from the motion detection unit 9. In accordance with the photographing time difference data and motion detection result, the insertion frame designation unit 49 determines the number of insertion frames and notifies it to the encoding unit 5. For example, the insertion frame number determination rules are given as in the following:

a) if the motion detection process is not adopted, insert m frames;

b) if the motion detection result is "not detected", insert m frames; and c) if the motion detection result is "detected", insert n frames, wherein m and n are positive number and m>n.

An insertion frame image is assumed to be the same image as that immediately before the insertion frame images.

In accordance with the number of frames determined by the determination rules at the insertion frame designation unit 49, i.e., in accordance with m or n frames, the encoding unit 5 generates m or n frames of P frame of the same image as that immediately before the insertion frame images, and inserts the frames immediately after the same image to generate moving images of the MPEG2 video format.

Next, description will be made on a concrete operation of the video signal encoding apparatus 240. Similar to the first embodiment, not only the photographing time data but also photographing direction data is used in the supplementary information.

Figure 4:
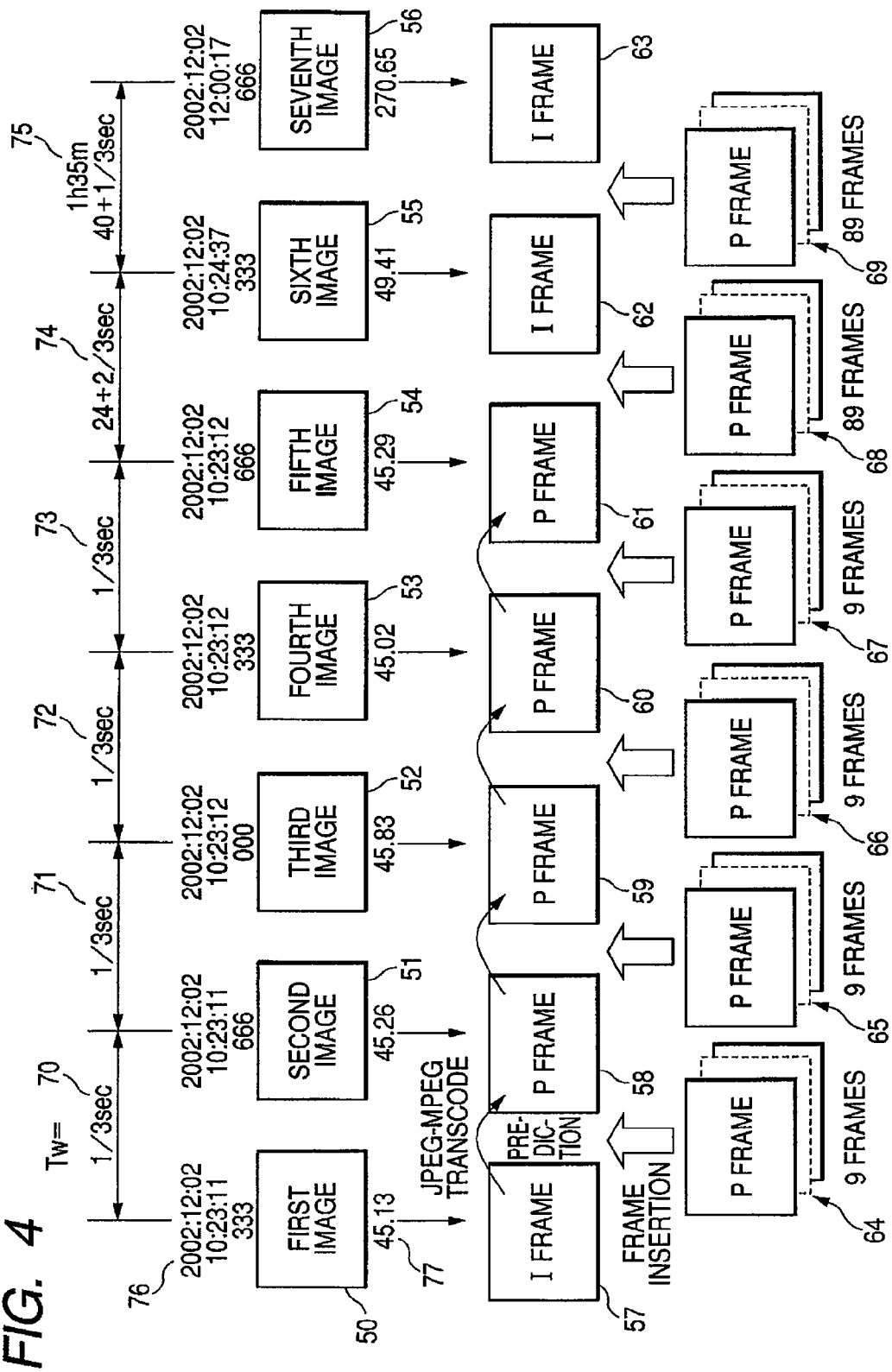
FIG. 4 is a diagram illustrating a video signal encoding sequence according to the second embodiment.

Referring to FIG. 4, a first JPEG image 50 is added with photographing time data 76 and photographing direction data 77. Similarly, photographing time data and photographing direction data are added to second to seventh JPEG images 51 to 56. The first JPEG image 50 is converted into the format of I frame 57 of the MPEG2 video format. The second JPEG image 51 is converted into the format of P frame 58 of the MPEG2 video format. Similarly, the third to fifth JPEG images 52 to 54 are converted into the format of P frames 59 to 61, and the sixth and seventh JPEG images 55 and 56 are converted into the format of I frames 62 and 63.

Similar to the first embodiment, it can be presumed that the photographer photographed consecutively the first and second JPEG images by directing the camera along the same direction.

By setting the conditions of making the motion detection unit 9 execute the motion detection process in the manner similar to the first embodiment, P frame 58 was able to be converted by referring to I frame 57. Similarly, motion vector detection is preformed between the second and third JPEG images 51 and 52, between the third and fourth JPEG images 52 and 53 and between the fourth and fifth JPEG images 53 and 54 to convert into P frames 59, 60 and 61.

The motion detection process is not executed between the fifth and sixth JPEG images 54 and 55 and between the sixth and seventh JPEG images 55 and 56 to convert into I frames 62 and 63.

Assuming that the insertion frame number determination rules indicate m=89 and n=9 then:

a) if the motion detection process is not adopted, insert 89 frames;

b) if the motion detection result is "not detected", insert 89 frames; and c) if the motion detection result is "detected", insert 9 frames.

The values m and n are not limited thereto.

In accordance with the insertion frame number determination rules, the insertion frame designation unit 49 decides first to insert a P frame group 64 of nine frames immediately after I frame 57 and instructs the encoding unit 44. In accordance with the decision of the insertion frame designation unit 49, the encoding unit 44 inserts the P frame group 64 by nine frames immediately after I frame 57. Similarly, in accordance with a decision by the insertion frame designation unit 49, the encoding unit 44 inserts P frame groups 65, 66 and 67 of nine frames at the position where the motion detection result is "detected", i.e., immediately after P frames 58, 59 and 60, respectively. Since the motion detection results are "not detected" immediately after P frame 61 and I frame 62, P frame groups 68 and 69 of eighty nine frames are inserted. In this embodiment, although insertion frames are not inserted immediately after I frame 63, a P frame group of, e.g., eighty nine frames may be inserted.

As described above, according to the video signal encoding apparatus 240 of the second embodiment of the present invention, in accordance with the supplementary information and the detection result of the motion detection unit 9, the number of frames to be inserted immediately after each frame is decided, and the frames same in number as the number of frames for generating the same images as each frame image are inserted to generate moving image information of the MPEG2 video format. It is therefore possible to automatically generate moving image information of the MPEG2 video format having a reproduction time suitable for observation, for each JPEG image. It is therefore possible to prevent the display time of each frame from becoming too short when the moving image information of the MPEG2 video format is reproduced.

In the second embodiment described above, the insertion frame designation unit 49 decides the number of insertion frames in accordance with the supplementary information (judgement of whether the motion detection process is adopted) and motion detection result ("not detected", "detected"). However, the number of insertion frames may be decided in accordance with only the supplementary information (judgement of whether the motion detection process is adopted). In this case, even if the motion detection result is "not detected", frames small in number (e.g., nine frames) are inserted. However, since the photographing time interval is short (and the photographing directions are near to each other), i.e., since the images are analogous, there occurs no problem even if the reproduction time becomes short.

Third Embodiment

The third embodiment describes an example of a video signal encoding apparatus which inputs JPEG image data with supplementary information as a compression frame image information group subjected to intra-frame encoding and outputs MPEG2 video data synthesizing a plurality of frame images as compression moving image information subjected to both inter-frame prediction encoding and intra-frame encoding.

Figure 5:
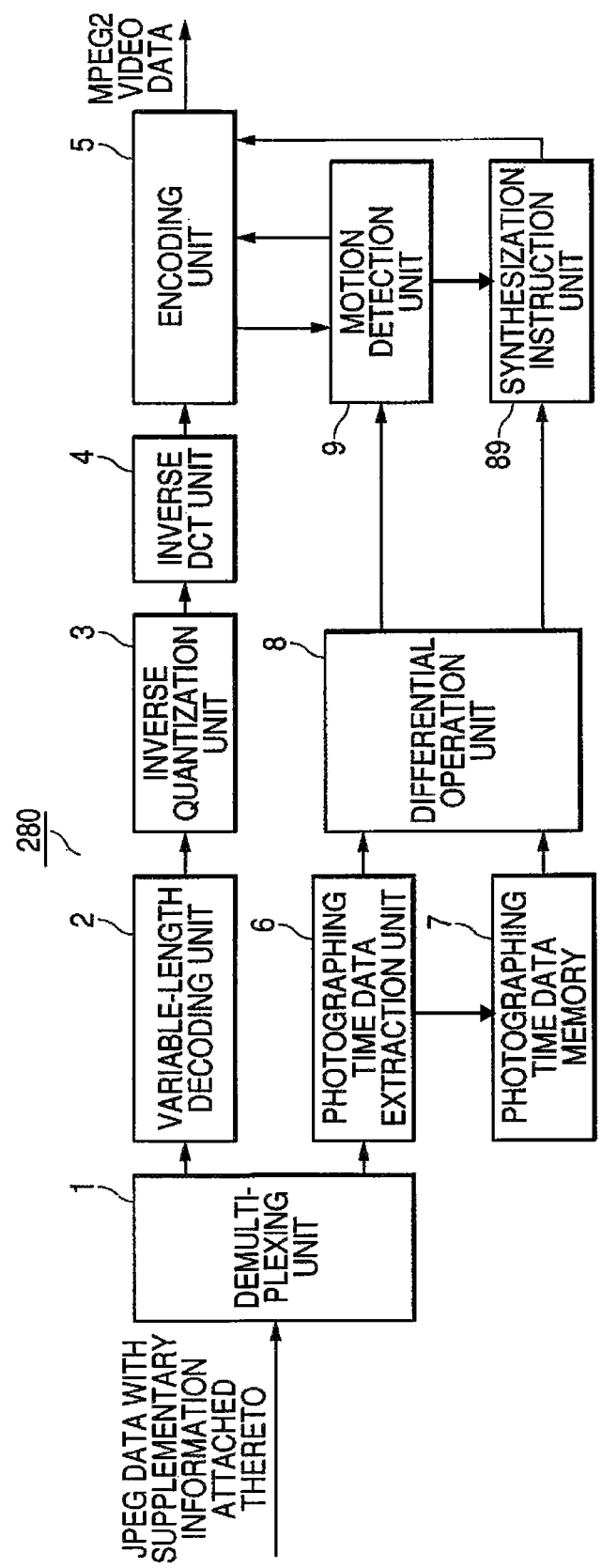
FIG. 5 is a block diagram showing part of the structure of a video signal encoding apparatus according to a third embodiment.

FIG. 5 is a block diagram showing part of the structure of a video signal encoding apparatus according to the third embodiment.

In FIG. 5, blocks having identical reference numerals to those of the first embodiment described with reference to FIG. 1 have similar functions. A different point from the first embodiment resides in that a synthesization instruction unit (synthesization image judging means) 89 for instructing to form a multi-image.

Next, the operation of a video signal encoding apparatus 280 will be described. The operation of generating MPEG2 moving image data from JPEG image data with supplementary information is similar to that of the first embodiment, and the description thereof is omitted.

The synthesization instruction unit 89 receives photographing time difference data from the differential operation unit 8 and the motion detection result from the motion detection unit 9. In accordance with the photographing time difference data and motion detection result, the synthesization instruction unit 89 judges image synthesization and notifies a judgement result to the encoding unit 5. For example, the image synthesization judgement determination rules are given as in the following:

d) if the motion detection process is not adopted, image synthesization is riot judged and the frame image is output as it is;

e) if the motion detection result is "not detected", image synthesization is not judged, and the frame image is output as it is; and f) if the motion detection result is "detected", image synthesization is judged, and other analogous images of x frames (where x is a positive number) are synthesized through multi-image synthesization.

The analogous images mean an original image for which motion detection was performed (frame image immediately after a multi-image) and images whose motion detection results are "detected" in succession. The multi-image synthesization means that one screen area is divided into x areas and images of x frames are compressed and assigned to respective areas to synthesize as one image.

When multi-image synthesization is to be instructed, it is mainly instructed to synthesize images whose motion detection results are "detected" in succession, on a multi-synthesization screen of x frames. If the total number of frames of images whose motion detection results are "detected" in succession is smaller than x frames, it is instructed to synthesize also the image immediately before the multi-image, on the multi-synthesization screen. If the total number of images whose motion detection results are "detected" in succession and the image immediately before these images, is smaller than x frames, an empty area may be formed on the multi-synthesization screen, the number of divided areas may be changed, or the number of frames to be synthesized may be changed.

Image synthesization of the embodiment is one example of multi-image synthesization. The invention is not limited particularly to the multi-image display, but various image synthesizing processes may be used such as alpha blend of superposing a plurality of semi-transparent frames and fade-in/ fade-out.

Next, description will be made on a concrete operation of the video signal encoding apparatus 280. FIG. 6 is a diagram illustrating video signal encoding according to the third embodiment. Operations similar to those of the first and second embodiments are omitted.

Assuming that the image synthesization judgement rules indicate x=4, then:

d) if the motion detection process is not adopted, image synthesization is not judged and the frame image is output as it is;

e) if the motion detection result is "not detected", image synthesization is not judged, and the frame image is output as it is; and f) if the motion detection result is "detected", image synthesization is judged, and other analogous images of four frames are synthesized through multi-image synthesization.

The value x is not limited thereto.

In accordance with the image synthesization judgement determination rules, the synthesization instruction unit 89 instructs the encoding unit 84 to encode and output I frame 114 because the image of I frame 107 is not synthesized but output as a whole screen image. P frame 108 is once decoded in accordance with, e.g., a difference from I frame 107 and thereafter reduced by ½ (¼ in terms of area) and synthesized on an upper left partial screen 118 of I frame 115 to be encoded and output. Similarly, P frames 109, 110 and 111 are reduced by ½ and synthesized on partial screens 119, 120 and 121 of I frame to be encoded and output. Since the images of I frames 112 and 113 are not synthesized but used as the images on whole one frame screens, I frames 116 and 117 are encoded and output, respectively.

In this embodiment, for the purposes of description convenience, synthesized image are generated by temporarily encoding frames and generating P frames (e.g., 108, 109, 110 and 111) at an intermediate stage. Instead, still images (e.g., 101, 102, 103 and 104) reproduced from JPEG images in accordance with the supplementary information and motion detection may be synthesized directly to form a synthesized image. In this case, the calculation process amount is obviously small. Also in this case, image synthesization may be judged in accordance with only the supplementary information, and after the synthesized image is generated, a single image or synthesized image may be encoded into the MPEG format.

As described above, according to the video signal encoding apparatus 280 of the third embodiment of the present invention, the frame images 101, 102, 103 and 104 to which the motion prediction process is judged to be adopted, are synthesized as a synthesization image 115 to generate moving image information of the MPEG2 video format including the synthesization image 115. It is therefore possible to reduce and synthesize a proper number of frames efficiently and to automatically generate moving image information of the MPEG2 video format including a single image or synthesization image suitable for observation, for each JPEG image. It is therefore possible to prevent the display time of a plurality of frame images having analogous image-contents from becoming long, when the moving image information of the MPEG2 video format is reproduced.

In the description of the first to third embodiments described above, image information compressed by the JPEG format is decoded and converted into the moving image information compressed into the MPEG format. Instead, any compression method may be used if a plurality of compression frame image information pieces compressed into the MPEG format and encoded by the intra-frame encoding method are converted into the format of compression moving image information encoded by using both the intra-frame encoding method and the inter-frame encoding method of recording differences between a plurality of frame images.

It is possible to record moving image information compressed by the MPEG method in a moving image recordable recording medium such as a hard disk, a digital VTR and DVD and repetitively reproducing and viewing moving images.

The object of the present invention can also be achieved by providing a storage medium storing program codes for performing the aforesaid processes to a video signal encoding apparatus, reading the program codes, by a CPU or MPU of the image sensing system or apparatus, from the storage medium, then executing the program.

In this case, the program codes read from the storage medium realize the functions according to the embodiments, and the storage medium storing the program codes constitutes the invention.

Further; the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the video signal encoding apparatus, the present invention includes a case where an OS (operating system) or the like working on the computer performs a part or entire-processes in accordance with designations of the program codes and realizes functions according to the above embodiments.

Furthermore, the present invention also includes a case where, after the program codes read from the storage medium are written in a function expansion card which is inserted into the video signal encoding apparatus or in a memory provided in a function expansion unit which is connected to the video signal encoding apparatus, CPU or the like contained in the function expansion card or unit performs a part or entire processes in accordance with designations of the program codes and realizes: functions of the above embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2005-010845 filed on Jan. 18, 2005, which is hereby incorporated by reference herein.

What is claimed is:

1. A video signal encoding apparatus for converting a plurality of compression frame image data encoded by an intra-frame encoding processing into compression moving image data encoded by using both an inter-frame prediction encoding processing and the intra-frame encoding processing, comprising:
    a decoding unit for decoding each of the compression frame image data of the plurality of compression frame image data into a frame image data;
    a supplementary information extracting unit for extracting time information or direction information added to each compression frame image data;
    a compression moving image generation unit for obtaining time difference or direction difference between succeeding frame image data from the added time information or direction information and encoding the frame data by applying thereto the inter-frame prediction encoding processing when the time difference or direction difference is within a predetermined range, thereby generating the compression moving image data.

2. A video signal encoding apparatus according to claim 1, wherein said compression moving image generation unit detects a motion vector between the succeeding frame image data in a case where the time difference or the direction difference is within the predetermined range, and performs the inter-frame prediction encoding processing by using the detected motion vector.

3. A video signal encoding apparatus according to claim 1, wherein the compression frame image data is still image information compressed by the intra-frame encoding processing of a JPEG format or a JPEG2000 format, and said compression moving image data is moving image data compressed by a MPEG format.

4. A video signal encoding method of converting a plurality of compression frame image data encoded by an intra-frame encoding processing into compression moving image data encoded by using both an inter-frame prediction encoding processing and said intra-frame encoding processing, comprising the steps of:
    decoding each compression frame image data of the plurality of compression frame image data into a frame image;
    extracting time information or direction information added to each compression frame image data; and
    obtaining time difference or direction difference between succeeding frame image data from the added time information or direction information and encoding the frame data by applying thereto the inter-frame prediction encoding processing when the time difference or direction difference is within a predetermined range, thereby generating the compression moving image data.

* * * * *